June 29, 1965  A. C. PETERSON  3,191,707
AUTOMOTIVE PROPULSION SYSTEM FOR VEHICLES
Filed June 18, 1962  3 Sheets-Sheet 3

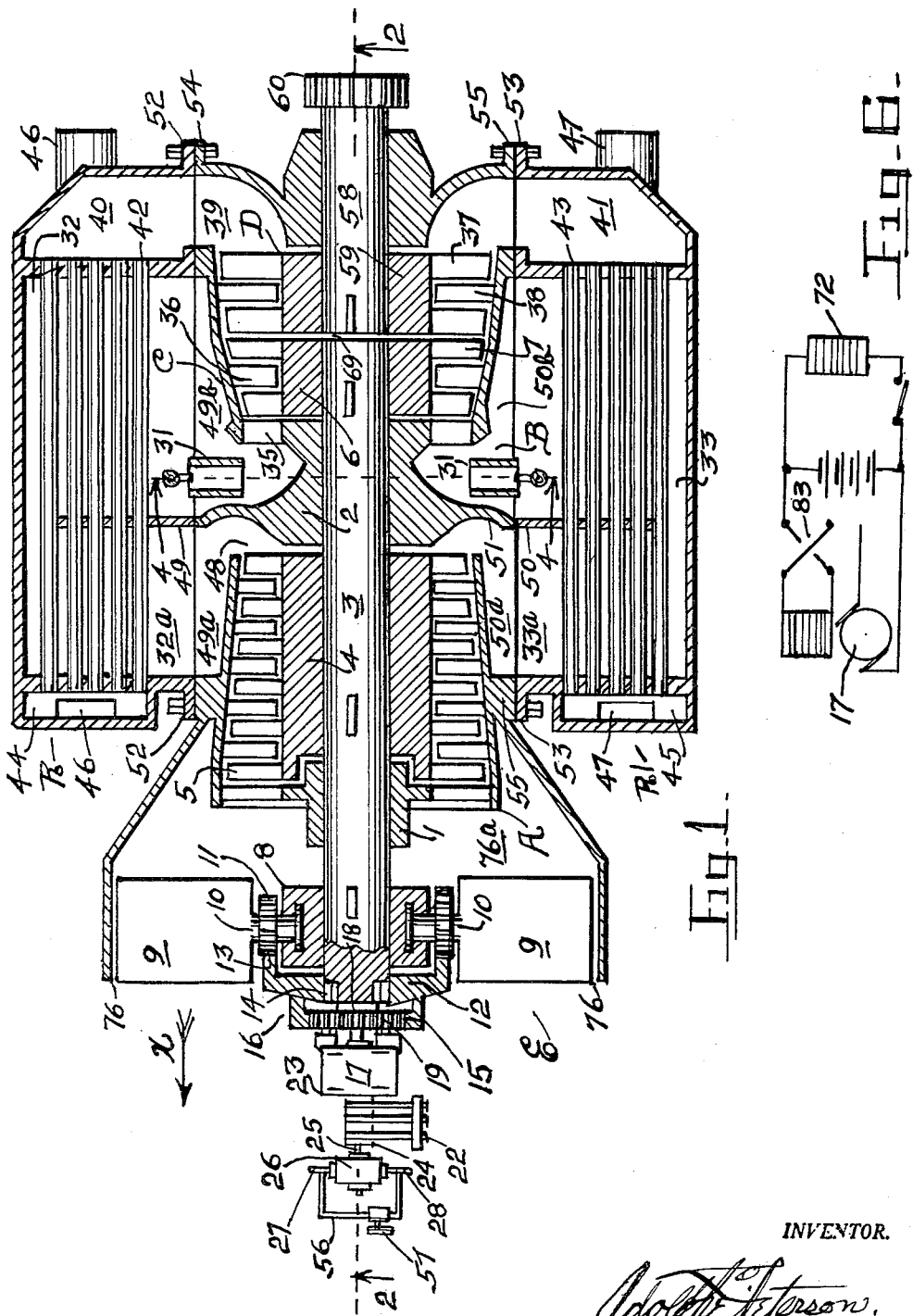

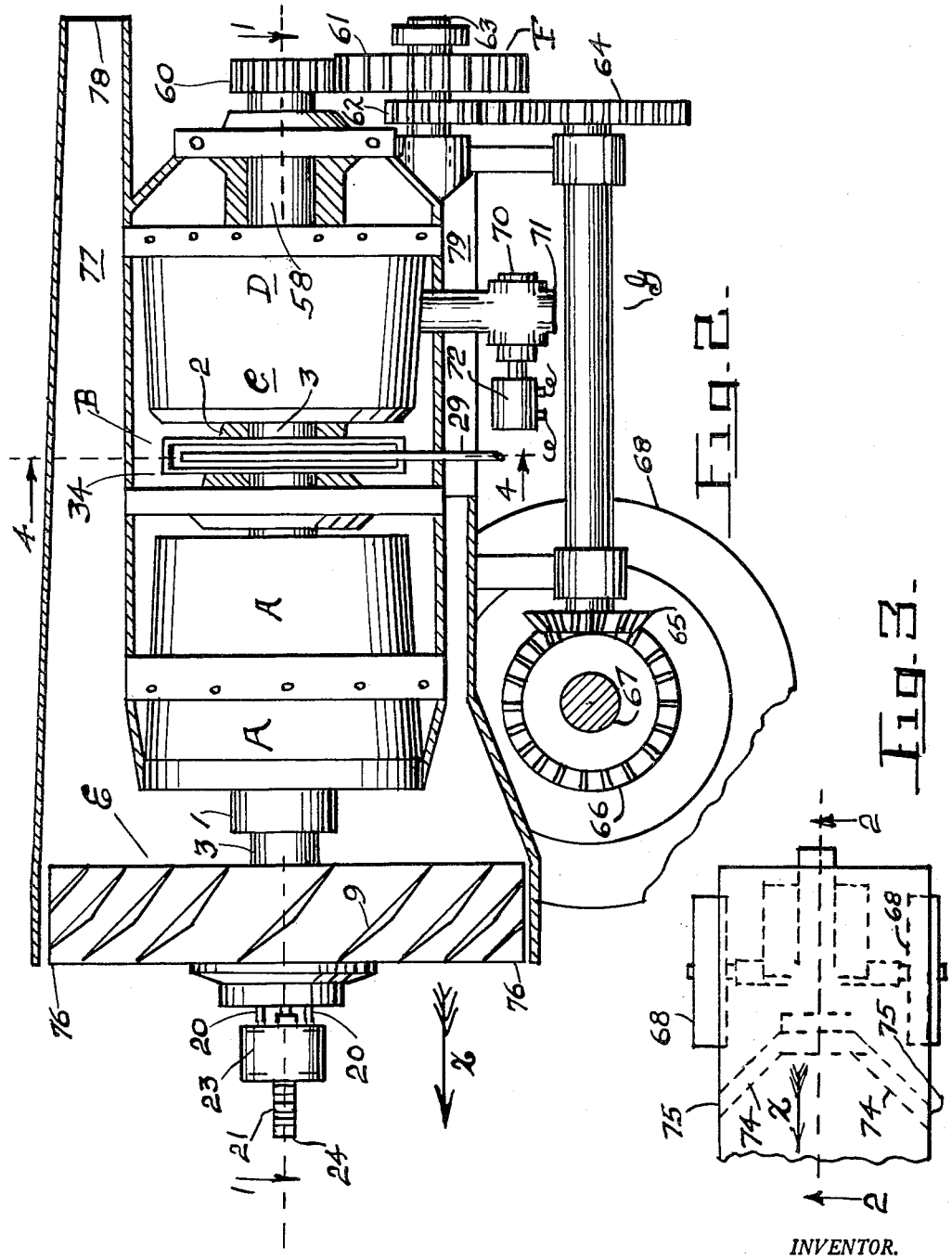

INVENTOR.
Adolph C. Peterson.

United States Patent Office 3,191,707
Patented June 29, 1965

3,191,707
AUTOMOTIVE PROPULSION SYSTEM
FOR VEHICLES
Adolphe C. Peterson, 4623 Bruce Ave. S.,
Minneapolis 24, Minn.
Filed June 18, 1962, Ser. No. 203,230
14 Claims. (Cl. 180—7)

My invention relates to engines for power production and particularly to a means for vehicle propulsion and embodies a system for such propulsion of a unique character and it is called Automotive Propulsion System for Vehicles.

The system is such that it may be applied for use in connection with power production means or internal combustion engines of various types such as the usual reciprocating piston type engine or diesel type engine, but this system is especially intended for use with or as embodying the gas turbine type of power production. For such use the system has features of simplicity in construction, improvement in power production economy, space saving construction, and in general advantages in its application especially to the usual passenger type of vehicle whether for public or private use. The chief object is the provision of a type of power production and transmission and propulsion which serves to improve the propulsion of road vehicles which operate or travel at considerable speeds for highway or free-way passenger travel or cargo travel. It is a well known fact that automotive vehicles when traveling at speeds such as forty, fifty, eighty or more miles per hour, must utilize a large proportion of the power production ability to overcome the resistance to vehicle movement of air through which the vehicle travels. It seems to be an accepted fact that the propulsion power needed to overcome air resistance increases as the cube so that therefore the power production required for propulsion will be very much greater at the higher speeds of travel than at the lower speeds of travel. In fact, the power required for travel, considering only the air resistance, will be substantially eight times as much at eighty miles per hour as at forty miles per hour, highway conditions being substantially similar.

The chief object of this invention is therefore to provide a system which provides especially means for propulsion in air resistance and in a highway vehicle so that this resistance is overcome or compensated for in a manner which results in less burden for the usual transmission which is used to propel a vehicle over the highways. A further objective is to provide such a system with such advantages in highway travel, in a form which is not excessively complicated, or excessively expensive to produce, or excessively costly in maintenance, and thus to provide this form of propulsion in a manner which is acceptable for such use and practicable for production and use. In general the object is improvement of vehicle construction and propulsion.

The principal devices and combinations of devices which constitute my invention are as hereinafter described and as more particularly defined in the claims. In the accompanying drawings which illustrate my invention, like characters refer to like parts in so far as practicable.

Referring to the drawings:

FIGURE 1 is a view chiefly in horizontal cross section through the axes of the elements which produce the power for propulsion, this section being on the lines 1—1 of FIGURES 2, 4 and 5, some parts being broken away, some parts being shown in relative diagrammatic form.

FIGURE 2 is a view chiefly in vertical cross section through the axes of the casing means and some of the engine elements and transmission means, some of the engine means being shown in vertical side elevation, some parts being broken away, some parts being diagrammatically shown only, the section being on the lines 2—2 of FIGURES 1, 3, 4, 5.

FIGURE 3 is a diagrammatic or schematic view of the rear portion of an automotive vehicle to show the general location in a vehicle and the general application of the propulsion means in a vehicle, the forward end of the vehicle being broken away.

Figure 4:
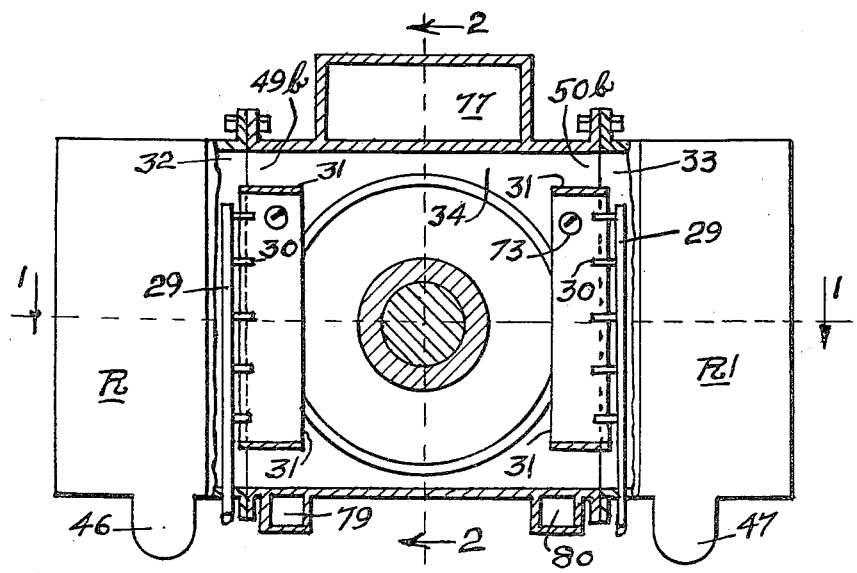

FIGURE 4 is a view partly in vertical cross section on the line 4—4 of FIGURES 1 and 2, partly in front elevation view looking from forwardly of the line 4—4 (FIGURES 1,2) this being with respect to the regeneration means particularly.

Figure 5:
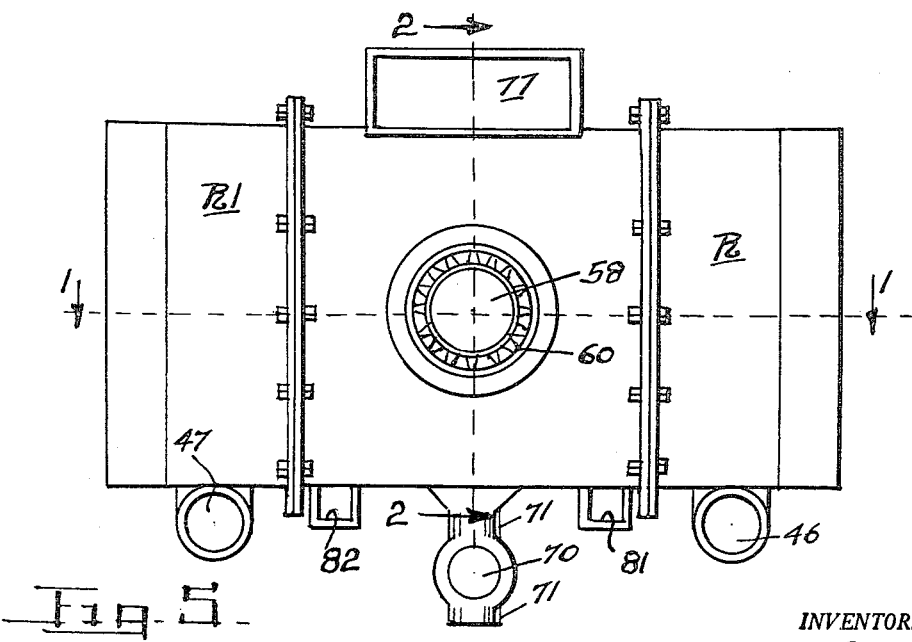

FIGURE 5 is a view looking from rearwardly of the device, but without showing any of the gear means transmitting to wheel means, except that the spur gear fixed on the work engine which drives to the wheel means is shown.

FIGURE 6 is a diagram showing the control means or elements by which the driver of a car is in manual control of the power production and transmission. This control is supplemented by a fuel control means.

Referring first to the FIGURES 1, 2, 4, 5, there are as major units of the device, the air compressor unit A, the combustion chamber unit B, the primary power turbine unit C, the secondary power unit D, the air propellor or ducted fan unit E, the regeneration units R and R1 respectively, the gear transmission F, the driving propellor shaft G. The units A, B, C and D are so located that they are successively in line axially from one end to the other of the power production means. The units A, B, C, D, are located in a horizontal plane which is above the plane of the axis of the propellor shaft G.

The primary power turbine unit C has mounted rotationally in bearings 1 and 2 the main power shaft 3 and on the latter there are fixed for rotation therewith the air compressor rotor 4 having blades 5 and the primary power turbine rotor 6 having blades 7, and that main power shaft 3 has mounted on and fixed thereon at its forward end the air fan hub 8 which has fan blades 9 mounted therein each fan blade 9 being oscillatively mounted in the hub by means of a blade shaft or axle designated, as to each, as 10, each of the latter having fixed thereon or formed therewith a small spur gear or a sector of such a spur gear which is designated, as to each, as 11. A disk 12 is oscillatively mounted at its axial center on the extreme forward end of the main power shaft 3 and this disk 12 by its laterally facing gear 13 is in constant engagement with each of the small spur gears 11 so that when the disk 12 with its gear 13 is oscillated on the axis of the main power shaft 3 and relatively to the latter, that oscillation will produce a proportionate oscillation of each of the fan blades 9 on its axis which latter axis is, as to each fan blade, substantially a radius extending from the axis of the main power shaft 3 in a plane substantially transversely and perpendicularly of the axis of the main power shaft 3. Each fan blade 9 is formed substantially as fan blades or air propeller blades are formed and each may have an oscillation on its own axis of oscillation which oscillation is not more than 90 degrees but may be less than that and that oscillation is limited by a limitation of oscillation of the disk 12 which latter limitation is effected by a pair of diametrically placed tongues 14 each of which may move through a limited oscillation in an associated slot formed in the extreme end of the main power shaft 3. In lieu of that limitation means any other oscillation limitation means may be built into the hub means or the fan blade means so that the oscillation is limited or that oscillation may be in any manner controlled and limited.

The disk 12 with its gear 13 is powered to have the oscillation movement by means of an internal spur gear 15 formed in the hub part 16 and torque for the oscillation movement relatively is produced by an electric motor 17 which may drive small pinion 18 in either direction and drives the internal gear 15 through the planetary gears 19, the motor field being fixed to the main power shaft 3 by means of the brackets 20. The electric motor 17 is controlled by means of a contact cylinder having three contacts 21 and with which respectively contact brushes 22 cooperate.

The field casing 23 of the electric motor 17 is fixed by the brackets 20 so that rotation is with the main power shaft 3 and thus also so that the contact cylinder 24 and extended shaft 25 rotate with the main power shaft 3 and thus drive the pumping element (not shown) of fuel pump 26 which latter receives fuel from supply pipe 27 and discharges fuel by conduit 28 to two fuel distribution conducts 29 each of which discharge through a number of small fuel jets 30 to each of the two individual combustion chambers within combustion walls 31 each rectangularly formed. Each combustion chamber formed by walls 31 is relatively long vertically and narrow in transverse width (FIGURES 1, 2, 4) and a portion of the air for combustion or substantially all passes into these combustion chambers from compressed air preheating chambers 32 and 33 respectively and moves toward the axis of the combustion gas space 34 which is annular in form and formed about the bearing 2, and that combustion gas space receives additional air from the space about the sides, that is, the walls of the combustion chambers so that the combustion gases are provided with more air and are also cooled and pass as somewhat cooled to the nozzles between guide blades 35 and thus pass to the main turbine blades 7 in two stages, passing the intermediate guide blades 36.

The combustion gases and additional air pass from the primary power turbine rotor and blades 7 to the secondary power turbine unit driving the blades 37 thereof (two stages) and guided by intermediate stator blades 38 and then pass to the annular exhaust chamber 39. From the latter chamber 39 and the gases pass in two divisions to the two regenerative unit header chambers 40, 41, respectively and then pass through regeneration tubes 42, 43, respectively and then to exhaust chambers 44, 45 of the regenerative units, and therefrom by means of two exhaust pipes 46, 47, to atmosphere, rearwardly of the vehicle. The hot gases in their passage through regeneration tubes 42, 43 will transfer heat to the compressed air which flows from the annular discharge chamber of the air compressor, this discharge chamber designated 48, in two divisions to the forwardly located portions 32a, 33a respectively of the chambers 32, 33, and then flows around the laterally outwardly ends of the two bisecting walls 49, 50, respectively, and then to the combustion chambers within walls 31 and also in the spaces around those walls 31 to provide the combustion air and also the heated cooling air.

The regenerative units R and R1 are each formed by rectangular box-like walls each open on the one side nearest the combustion spaces so that the compressed air spaces of one regeneration unit is open to the space 49a and the other is open to the space 50a for reception of the compressed air from the air compressor, and also so that the compressed air spaces of the one regeneration unit on the rearward side of the bi-secting wall is open to the space 49a and on the other side the compressed air space of the other regeneration unit is open to the space 50b for delivery of the heated compressed air to the combustion spaces. The division wall 51 in the turbine casing, that is formed therein and with it, is substantially rectangular in shape and thus so divides the spaces adjacent the combustion chamber spaces so that compressed air does not flow to the combustion spaces until it has passed adjacent the regeneration tubes 42, 43. The regeneration units R and R1 have respectively a rectangular flange which contacts a corresponding and complementing flange on each side of the turbine unit casing, the former flanges designated 52 and 53 respectively and the latter (on the turbine casing) being designated 54 and 55 respectively.

The main power shaft 3 drives the fuel pump means as described and thus delivers fuel through the fuel nozzles designated to the combustion chambers for combustion with the passing air, so that fuel delivery is in proportion to flow of compressed air, and that flow may be controlled by a by-pass pipe 56 opened or closed by means of the throttle valve 57 (by-pass valve).

The secondary power unit D has a work shaft 58 which is driven by the blades 37 on its rotor 59 and the shaft 58 has on its extreme rearward end the small spur or other gear 60 and the latter is in constant engagement with the large gear 61 which gear and small gear 62 are fixed on intermediate shaft 63 so that there is drive thereby to large gear 64 from the work shaft 58 to the driving propeller shaft and thus to bevel gear 65 and the large bevel gear 66 which drives the road wheel shaft 67, there being as the result a large reduction of driving speed as between the work shaft 58 and the road wheel shaft 67 on the ends of which there are mounted are rotatable thereby the road wheels 68. There may be a total speed reduction so that the turbine work shaft 58 may rotate at speeds as much as ten times the speed of the road wheels 68, or even more than that.

There is as appear in FIGURE 1 a space between the main or primary turbine rotor 6 and the secondary or work turbine rotor 59 and the gases of combustion and air pass through this space to the blades of the work turbine rotor 59 in normal operation, but the operator or driver of the automotive vehicle may secure release of gases directly from the space designated, which is designated 69, to atmosphere so that such gases will not then drive the work turbine rotor 59 and the road wheels, this release being provided so that there may be direct release of gases in starting of the main turbine, or as desired in idling of the engine, or even at such times as it is desired to procure propulsion only by the ducted fan unit E, which may be at times when it is sufficient for propulsion and also at times when it is desired to procure reverse propulsion of the automotive vehicle. The release of gases as described may be effected by the driver by causing passage of electric current to a solenoid means to move the cylindrical valve 70 to a position opening or permitting gas passage through pipe 71 to atmosphere. The solenoid means 72 is of any form as commonly used for control means and has the usual spring means to move the valve 70 to a closing position as to pipe 71, the solenoid providing electro-magnetic torque to move the valve 70 the other way to the position opening pipe 71 to atmosphere.

Spark plugs 73 are provided in each combustion chamber for the ignition of gases, these being provided with electric current in any manner as is customary in turbines. The device is mounted in rearward end of an automotive vehicle as a passenger car. This mounting is shown in diagrammatic manner in FIGURE 3 where it is shown to be provided with proportionately large air passages 74 which provide entry at ports 75 for atmospheric air, which passes to the air induction port 76 to the ducted air fan unit D and thereby to the turbine air compressor means. Entry of atmospheric air may be provided for by any other suitable means. The large arrows X indicate the direction of forward propulsion of car and engine device in normal forward travel. There may be reverse propulsion by means of the ducted fan unit D as hereinafter described, but it should be noted that there may be provided, if that be desired, any such reverse driving gear means as is commonly used in automotive vehicles so that that means of reverse propulsion may also be utilized if it is considered necessary in any particular construction.

Having described particularly in detail the device and its devices, the general operation and use in now briefly described and explained. I have not shown but it is contemplated that the primary power turbine unit be provided with such means as are commonly known and used for the initiation of rotation of the main power shaft 3, so that by this rotation the flow of air and fuel is initiated. The diagrammatic illustration in FIGURE 6 shows means for control of the ducted air fan unit and also for control of the valve 70 by means of the solenoid means 72. In the operation of the primary power turbine unit C the speed of its main shaft 3 is controlled by the driver of the car by means of the fuel throttle or by-pass valve 57 so as to procure idling or work speeds.

In operation of the main power shaft 3, when the air fan hub 8 and fan blades 9 are in rotation and the fan blades 9 are so placed with reference to their individual axes in hub 8, atmospheric air is drawn into the air port 76 and to the air chamber 76a and such inducted air is divided into four general streams one of which is the air stream entering the air compressor casing for compression in the air compressor unit A and the other three of which are air propulsion or thrust streams, one of which streams flows through the jet propulsion tube 77 and emerges to atmosphere at its discharge 78, the other two of which flow through the two smaller jet propulsion tubes 79, 80 and through their discharges 81, 82 to atmosphere as thrust streams. It is contemplated that the tubes 77, 79, 80, will each have such form as is capable of producing the most effective thrust propulsion by the ejected air stream, and it is contemplated that there may be no more than one of such jet tubes or more discharging from the stream produced by the fan blades 9. The means through which the air inducted flows will be proportioned to secure the proportionate flow through the main power turbine wihch is necessary for its effective operation as such turbine.

The air which flows through the air compressor casing flows in part through the combustion chambers within the walls 31 and in part around those walls and unites with the produced gases of combustion to flow as the power producing stream through the turbines. To propel the load, which is the automotive vehicle, the driver increases the fuel flow to increase the flow of gases and thereby the device produces two kinds of propulsion, one, that which is produced by the thrust jets from tubes 77, 79, 80, and the other that which is produced by the driving of the road wheels by means of the secondary or work turbine, and each of these propulsions is in the same direction of propulsion and as is indicated by the arrows X in the figures. The thrust upon the air flow such as is produced by the fan blades 9 is a part of that propulsion system.

When the driver desires to bring the vehicle to a stop, he may use the usual brakes, not shown in the figures, and he may also provide braking thrust or propulsion by doing two things for control, one, he may by the electric control of the fan blades 9, secured by means of reversing switch means 83 reverse the inclination or pitch of the fan blades 9, the electric motor 17 providing for relative turning of the disk 12 and the fan blades on their individual axes in hub 8, and two, he may open the pipe 71 by means of valve 70 whereby gases are discharged to atmosphere without propulsion of the secondary or work turbine. The inclination of fan blades 9 will then be such as to procure suction of air from the tubes 77, 79, 80, which then produces rearward propulsion, as may be needed, for the vehicle, this being not needed except for very short distances. After securing the stop of the vehicle the driver continues the operation of fan blades 9 with as much power as is needed to secure the rearward propulsion. Reverse propulsion by means of fan blades 9 will in some constructions suffice. In other constructions the customary wheel braking means (not shown) may be provided.

It is to be noted that the reversing ability provided for the fan blades 9 is such that this fan blade means is an effective means for causing a vehicle to be brought to a complete stop quickly. This is an effective braking system, as well as propulsion system, for the reason that the full power of the main or gas generation turbine C may be utilized to secure reverse propulsion by the fan blades 9. The pitch adjustment means is symbolic of such means. Any means for locking the pitch angle may be used such as commonly known. I have shown particular devices and combinations thereof, but it is contemplated that any means or devices accomplishing the means and functions may be used without departing from the spirit and contemplation of the invention.

What I claim is:

1. In propulsion means for vehicles: a primary engine driving a primary power shaft and having means supplying air and fuel to the engine for combustion therein; a secondary engine having a secondary power shaft and a transmission for transmitting driving power therefrom to a vehicle road-wheel means; conduit means by which gases under pressure are as exhausted from the primary engine delivered to the secondary engine for driving of the secondary engine and means for exhaust from said secondary engine; an air duct by which ambient air is inducted at one end thereof and is expelled at the other end thereof to atmosphere; a propulsion air propeller located in said air duct to propel air through said air duct and for propulsion of a vehicle; a driving connection between said propulsion air propeller and said primary power shaft.

2. In propulsion means for vehicles the device as defined in claim 1 and: said primary engine having a supplementary discharge therefrom to atmosphere and a valve means for said supplementary discharge to normally close said supplementary discharge and under control means therefor to permit discharge through this supplementary discharge to thereby cease driving of said secondary engine by the gases issuing from the primary engine and normally passing through said connection between said primary engine and said secondary engine to atmosphere.

3. The device as defined in claim 1 and: the said propulsion air propeller having means in association therewith under control to change the normal pitch angle of elements of the air propeller to provide thereby for reversal of flow of air in said air duct.

4. In propulsion means for vehicles: a primary engine driving a primary power shaft and having means supplying air and fuel to the engine for combustion therein; a secondary engine of turbine type for power production having a secondary power shaft and a transmission for transmitting therefrom to a vehicle road-wheel means; conduit means by which gases under pressure as exhausted from the primary engine are delivered to the secondary engine for driving of the secondary engine and means for exhaust from said secondary engine; an air duct by which ambient air is inducted at one end thereof and is expelled at the other end thereof to atmosphere; a propulsion air propeller located in said air duct to propel air through said air duct and for propulsion of a vehicle; a driving connection between said propulsion air propeller and said primary power shaft.

5. The device as defined in claim 4 and: the said primary engine having a supplementary discharge therefrom to atmosphere and a valve means for said supplementary discharge to normally close said supplementary discharge and under control therefor to permit discharge through this supplementary discharge to thereby cease driving of the secondary engine by gases issuing from the primary engine and normally passing through the connection between said primary engine and said secondary engine to atmosphere.

6. The device as defined in claim 4 and: the said propulsion air propeller having means in association therewith under control to change the normal pitch angle of elements of the air propeller to provide thereby for reversal of flow of air in said air duct.

7. In propulsion means for vehicles: a primary engine of turbine type driving a primary power shaft and having means supplying air and fuel to the engine for combustion therein; a secondary engine having a secondary power shaft and a transmission for transmitting driving power therefrom to a vehicle road-wheel means; conduit means by which gases under pressure are as exhausted from the primary engine delivered to the secondary engine for driving of the secondary engine and means for exhaust from said secondary engine; an air duct by which ambient air is inducted at one end thereof and is expelled at the other end thereof to atmosphere; a propulsion air propeller located in said air duct to propel air through said air duct and for propulsion of a vehicle; a driving connection between said propulsion air propeller and said primary power shaft.

8. The device as defined in claim 7 and: the said primary engine having a supplementary discharge therefrom to atmosphere and a valve means for said supplementary discharge to normally close said supplementary discharge and under control means therefor to permit discharge through this supplementary discharge to thereby cease driving of said secondary engine by the gases issuing from said primary engine and normally passing through said connection between said primary engine and said secondary engine to atmosphere.

9. The device as defined in claim 7 and: the said propulsion air propeller having means in association therewith under control to change the normal pitch angle of elements of the air propeller to provide thereby for reversal of flow of air in said air duct.

10. In propulsion means for vehicles: a primary engine of turbine type driving a primary power shaft and having means supplying air and fuel to the engine for combustion therein; a secondary engine of turbine type having a secondary power shaft and a transmission for transmitting driving power therefrom to a vehicle road-wheel means; conduit means by which gases under pressure are as exhausted from the primary engine delivered to the secondary engine for driving of the secondary engine and means for exhaust from said secondary engine; an air duct by which ambient air is inducted at one end thereof and is expelled at the other end thereof to atmosphere; a propulsion air propeller located in said air duct to propel air through said air duct and for propulsion of a vehicle; a driving connection between said propulsion air propeller and said primary power shaft.

11. The device as defined in claim 10 and: the primary engine having a supplementary discharge therefrom to atmosphere and a valve means for said supplementary discharge to normally close said supplementary discharge and under control means therefor to permit discharge through this supplementary discharge to thereby cease driving of said secondary engine by the gases issuing from the primary engine and normally passing through said connection between said primary engine and said secondary engine to atmosphere.

12. The device as defined in claim 10 and: the said propulsion air propeller having means in association therewith under control to change the normal pitch angle of elements of the air propeller to provide thereby for reversal of flow of air in said air duct.

13. The device as defined in claim 10 and: the primary engine having a supplementary discharge therefrom to atmosphere and a valve means for said supplementary discharge to normally close said supplementary discharge and under control means therefor to permit discharge through this supplementary discharge to thereby cease driving of said secondary engine by the gases issuing from the primary engine and normally passing through said connection between said primary engine and said secondary engine to atmosphere; the said propulsion air propeller having means in association therewith under control to change the normal pitch angle of elements of the air propeller to provide thereby for reversal of flow of air in said air duct.

14. The device as defined in claim 1 and: the primary engine having supplementary discharge to atmosphere and valve means therefor to normally close such discharge and under control means to permit discharge therethrough to cease driving of said secondary engine by gases normally passing through said connection between primary and secondary engine; the said propulsion air propeller having means in association therewith to under control change the normal pitch angle of elements of the air propeller to provide thereby for reversal of flow of air in said air duct.

References Cited by the Examiner

UNITED STATES PATENTS

| | | | |
|---|---|---|---|
| 2,046,042 | 6/36 | Turner | 180—7 |
| 2,727,602 | 12/55 | Saives. | |
| 2,758,661 | 8/56 | Peterson | 180—7 |
| 3,023,577 | 3/62 | Williams et al. | 60—39.51 |
| 3,079,754 | 3/63 | Kolb | 60—39.51 |

FOREIGN PATENTS

| | | |
|---|---|---|
| 236,306 | 11/61 | Australia. |
| 713,346 | 8/54 | Great Britain. |

OTHER REFERENCES

Motor (periodical), April 1954, pages 58 and 176, "Gas Turbine for Stock Car."

A. HARRY LEVY, *Primary Examiner.*

LEO FRIAGLIA, *Examiner.*